Dec. 30, 1969  K. E. G. PERRY  3,487,209

READANT CONTROL FOR THERMOLUMINESCENT DOSIMETRY

Filed March 30, 1966

United States Patent Office 3,487,209
Patented Dec. 30, 1969

3,487,209
READOUT CONTROL FOR THERMO-LUMINESCENT DOSIMETRY
Kenneth Edward Gordon Perry, Weymouth, Dorset, England, assignor to United Kingdom Atomic Energy Authority, London, England
Filed Mar. 30, 1966, Ser. No. 538,791
Claims priority, application Great Britain, Apr. 5, 1965, 14,451/65
Int. Cl. G01t 1/20; H01j 39/18
U.S. Cl. 250—71.5    4 Claims

ABSTRACT OF THE DISCLOSURE

Thermoluminescent powder used in radiation dosimetry is heated to its glow temperature for the purpose of estimating the dose received by the powder while integrating the intensity of light omitted over that part of the glow period when light output is due to radiation of the powder. The light emitted at other than relevant periods is excluded by means which inhibits the operation of the integrator at selected periods.

---

Figure 1:
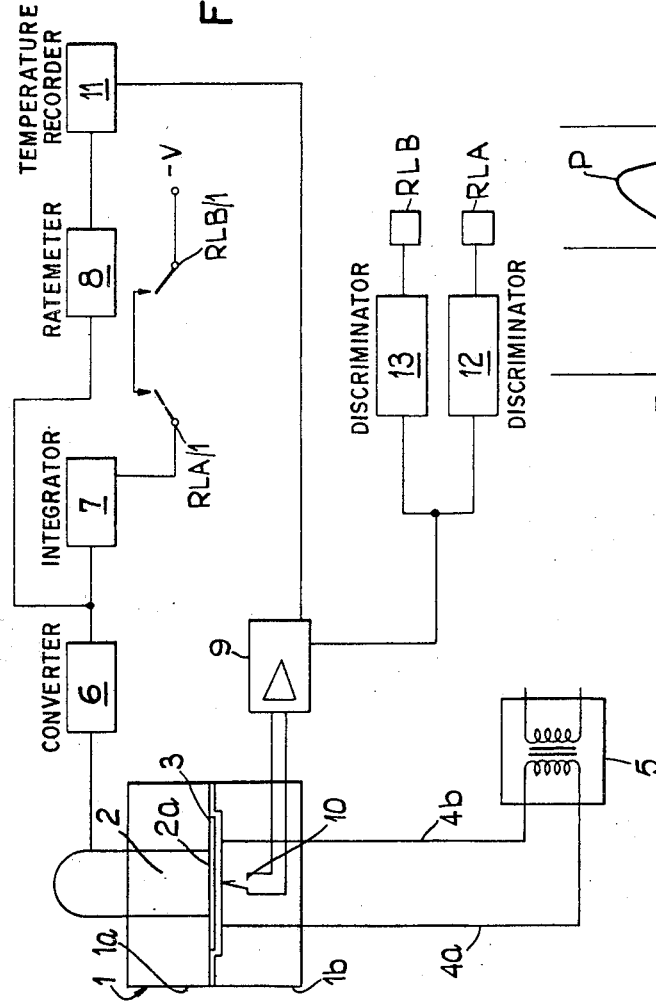

This invention relates to dosimetry techniques which employ the thermoluminescent properties acquired by certain chemical substances (such as activated lithium fluoride) when exposed to ionising radiation.

As will be known activated substances such as lithium fluoride or calcium fluoride have the capacity to absorb energy received during a period of radiation, to store the energy until heated to a temperature of several hundreds degrees centigrade (or "glow temperature"), and then to emit light, the intensity of which is a measure of the dose received by the substance. Thus in using these substances for dosimetry it has been the practice hitherto to heat the irradiated powder to its glow temperature whilst the light emitted is measured by the photo electric transducer in which the current received as a result of light falling on a light sensitive element is integrated during heating and the total current is expressed as equivalent to a measure of the dose received. A plot of light intensity against time-temperature is referred to as the glow curve, the area beneath which is integrated to provide a measure of the dose.

The disadvantage of this system becomes apparent when it is realised that a proportion of the stored energy emitted from the substance as light on heating may not in fact represent emission of stored irradiation energy but may arise from other spurious effects having nothing to do with the dose of radiation received by the substance.

A further proportion of stored energy emitted as light on heating at lower temperatures, although some function of the dose received, is not stable in time in as much as it may degenerate, or fade between exposure of the powder and read out, herein referred to as stable in time.

According to the present invention there is provided an arrangement for accomplishing a method of measuring the radiation dose received by a charge of thermoluminescent material which resides in heating the material to its glow temperature and integrating a part of energy due to light emission therefrom being that part which is dependent upon the dose of radiation received substantially to the exclusion of the remaining part.

On heating a charge of the thermoluminescent material which has received a dose of ionising radiation, it will be noted that the most significant light emission resulting from energy derived from the radiation received will occur within a fairly narrow temperature range and that light emission which occurs above this range is mainly due to spurious effects whilst that occurring below this range cannot be directly related to dose received. The present invention proposes apparatus for carrying out a method of reading out the dose received by a charge of thermoluminescent material which involves sensing the temperature of the material as it is being heated, integrating the light output from the material by an integrator and controlling the operation of the integrator to within a predetermined temperature range. Energy emitted at other temperatures is discounted.

Apparatus for carrying out the method comprises according to the invention, a dosimeter for measuring the radiation dose received by a charge of thermoluminescent material which comprises means for heating the charge to its glow temperature, means operative in response to a temperature sensitive control for integrating the light output therefrom over that part of the heating cycle on which the light emitted is related to the radiation dose received by the charge. In order that the invention may be more fully understood, one embodiment thereof will now be described with reference to the accompanying drawings in which:—

Figure 2:
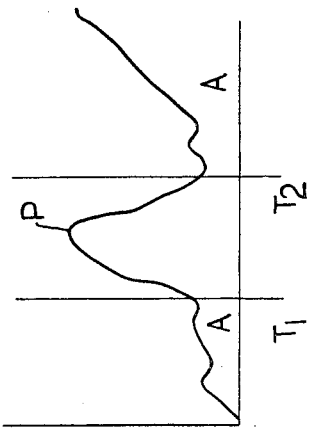

FIG. 1 is a schematic diagram showing the main items which comprise a read out device for thermoluminescent dosimetry and FIG. 2 is a representative glow curve for activated lithium fluoride powder showing the light intensity I plotted against temperature T during the heating of the irradiated powder.

In the drawing the numeral 1 indicates a light tight casing of an oven, the upper half 1a supports a photomultiplier tube 2 whose light sensitive screen 2a is positioned opposite to a metal tray 3 supported in the lower half 1b. The tray is connected as an electrical resistance by leads 4a, 4b with heating transformer 5 to which mains power is supplied when it is desired to heat a charge of irradiated thermoluminescent powder placed in the tray.

The photomultiplier tube 2 has its output connected to a D.C. to pulse converter unit 6 which is arranged to produce a train of pulses, the rate of which is a linear function of the input current. The pulse output of the converter unit 6 is applied to an integrator 7, e.g., a scaler and also to a ratemeter 8. The latter gives an indication of rate of light output from the powder whilst the former gives an indication of the integrated number of pulses counted, being indicative of the integrated dose.

A thermocouple 10 is mounted beneath the tray in order to sense the temperature of the tray, and thus that of the powder, whilst the latter is being heated. The thermocouple leads are connected to a low drift D.C. amplifier the output from which is connected a temperature recorder 11 which records a plot of temperature change on a graph. On this same graph, the ratemeter plots a graph of rate of light output as sensed by the photo multiplier 2. Thus the two plots can be compared. The output from the amplifier 9 is also applied to two discriminators 12, 13 which comprise a means operative in response to the thermocouple 10 to control the operation of the integrator. The discriminators 12, 13 are operative in response to lower and upper levels of D.C. current, to actuate relays RLA and RLB. The lower level D.C. discriminator 12, is adjusted to operate in response to a low current level corresponding to a low temperature limit to energise relay RLA. The relay RLA is effective through closing of relay contacts RLA/1 to remove an inhibit signal from the scaler 7. The high level D.C. discriminator 13 is correspondingly adjusted to energise relay RLB in response to an upper level of current indicative of a high temperature limit which opens contacts RLB/1 so to inhibit operation of the scaler 7. In this way the scaler operates only between the limits of temperature set by the discriminators.

A characteristic glow curve for irradiated lithium fluoride powder, shown in FIGURE 2, has light intensity plotted as ordinate against temperature as abscissa. As is known, the area under the glow curve is integrated to assess the dose received. From this figure it will be seen that the glow curve exhibits not only a peak P which occurs between the temeprature $T_1$ and $T_2$ but also additional areas A beneath the glow curve which originate from ancillary, or spurious, light emission not of direct consequence in dosimetry measurement but which detract from the validity of the reading. More precisely a proportion of the light emitted below the temperature $T_1$ is due to incorrect processing of the powder before use and a further proportion although due to energy stored during irradiation is not stable with respect to time at room temperature. The light emitted above the temperature $T_2$ is considered to be due largely to the spurious light output from the powder caused by tribothermoluminescence i.e. light induced by mechanical movement of the powder crystals, which is in no way related to the dose received. By suitable adjustment of the controller such that the relay contacts RLA/1 and RLB/1 are made only during the period when the temperature of the powder is within the range of $T_1$-$T_2$, the integrator will receive energy due only to the relevant part of the light emitted and hence integrate only the area between $T_1$ and $T_2$ so that a more satisfactory and stable reading may be obtained.

I claim:

1. A dosimeter for measuring the radiation dose received by a charge of thermoluminescent material which comprises means for heating the charge to its glow temperature, a light sensitive photoelectric transducer for sensing the light emitted, means for converting the electrical output of the transducer into a train of pulses, and means for integrating the pulses over that part of the heating cycle wherein the light emitted is stable in time and related to the radiation dose received by the charge.

2. A dosimeter as claimed in claim 1 and including means for sensing the temperature of the charge during heating, and means operative under control of said temperature sensing means to restrict the integration to within predetermined limits of temperature.

3. A dosimeter as claimed in claim 1 including a ratemeter connected to receive said pulse train whose pulse rate is a linear function of input current and yielding an output indicative of the rate of light output from the charge.

4. A dosimeter as claimed in claim 3 including means for providing a comparative indication of the rate of light output from the charge and the rate of change of temperature of the charge.

References Cited

UNITED STATES PATENTS

| | | | |
|---|---|---|---|
| 3,282,855 | 11/1966 | Palmer et al. | 250—71.5 X |
| 3,320,180 | 5/1967 | Swinehart | 250—71.5 X |

RALPH G. NILSON, Primary Examiner

S. ELBAUM, Assistant Examiner

U.S. Cl. X.R.

250—83; 252—301.2